(12) United States Patent
Gupta et al.

(10) Patent No.: US 10,329,859 B2
(45) Date of Patent: Jun. 25, 2019

(54) ALKYLPOLYGLUCOSIDE DERIVATIVE FLUID LOSS CONTROL ADDITIVES FOR WELLBORE TREATMENT FLUIDS

(71) Applicant: Halliburton Energy Services, Inc., Houston, TX (US)

(72) Inventors: Nivika Rajendra Gupta, Pune (IN); Sharad Bhimrao Gotmukle, Udgir (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/566,911

(22) PCT Filed: May 20, 2015

(86) PCT No.: PCT/US2015/031687
§ 371 (c)(1),
(2) Date: Oct. 16, 2017

(87) PCT Pub. No.: WO2016/186663
PCT Pub. Date: Nov. 24, 2016

(65) Prior Publication Data
US 2018/0086965 A1    Mar. 29, 2018

(51) Int. Cl.
*E21B 21/00* (2006.01)
*E21B 33/13* (2006.01)
(Continued)

(52) U.S. Cl.
CPC ........... *E21B 21/003* (2013.01); *C09K 8/36* (2013.01); *C09K 8/502* (2013.01); *E21B 33/138* (2013.01)

(58) Field of Classification Search
None
See application file for complete search history.

(56) References Cited

U.S. PATENT DOCUMENTS 5,494,120 A * 2/1996 Hale ................. C09K 8/36
175/65
5,710,107 A * 1/1998 Walker ................ C09K 8/08
507/110
(Continued)

FOREIGN PATENT DOCUMENTS

WO    2010083093 A2    7/2010
WO    WO2013174823   * 11/2013  ............. C09K 8/58
(Continued)

OTHER PUBLICATIONS

Natural Elements, Natural Looks; Mar. 2013; Colonial Chemical Inc.; pp. 1-4 (Year: 2013).*
(Continued)

*Primary Examiner* — Anuradha Ahuja
(74) *Attorney, Agent, or Firm* — Tenley Krueger; Baker Botts L.L.P.

(57) ABSTRACT

Methods of treating a subterranean formation with treatment fluids containing novel fluid loss control additives comprising alkylpolyglucoside derivatives for treatment fluids are disclosed. In certain embodiments, the methods comprise providing a treatment fluid comprising an emulsion comprising an oleaginous phase and a non-oleaginous phase, a fluid loss control additive comprising an alkylpolyglucoside derivative; introducing the treatment fluid into a wellbore. Fluid loss control additives, drilling fluids, and systems suitable for use therewith are also provided.

19 Claims, 1 Drawing Sheet

(51) Int. Cl.
*C09K 8/502* (2006.01)
*C09K 8/36* (2006.01)
*E21B 33/138* (2006.01)

(56) References Cited

U.S. PATENT DOCUMENTS

| | | | |
|---|---|---|---|
| 6,022,833 | A | 2/2000 | Mueller et al. |
| 6,569,814 | B1 | 5/2003 | Brady et al. |
| 6,627,612 | B1 | 9/2003 | O'Lenick, Jr. et al. |
| 7,413,013 | B2 | 8/2008 | Welton et al. |
| 7,527,102 | B2 | 5/2009 | Crews et al. |
| 7,781,379 | B2 | 8/2010 | Miller |
| 7,857,051 | B2 | 12/2010 | Abad et al. |
| 7,951,766 | B1 | 5/2011 | Frenkel et al. |
| 7,992,640 | B2 | 8/2011 | Huang et al. |
| 8,222,455 | B2 | 7/2012 | Knox |
| 8,313,654 | B2 | 11/2012 | Piazza et al. |
| 8,657,002 | B2 | 2/2014 | Willberg et al. |
| 8,778,850 | B2 | 7/2014 | Andrecola |
| 2004/0129459 | A1* | 7/2004 | Guichard ............ C09K 8/24 175/65 |
| 2005/0026803 | A1* | 2/2005 | Sivik ............ A62D 1/0071 510/357 |
| 2005/0250666 | A1* | 11/2005 | Gatlin ............ C09K 8/38 510/424 |
| 2006/0084579 | A1 | 4/2006 | Berger et al. |
| 2007/0219097 | A1 | 9/2007 | Mueller et al. |
| 2007/0219098 | A1 | 9/2007 | Mueller et al. |
| 2007/0295368 | A1* | 12/2007 | Harrison ............ C09K 8/26 134/42 |
| 2008/0138327 | A1 | 6/2008 | Kelly |
| 2008/0139415 | A1* | 6/2008 | Todd ............ C09K 8/506 507/241 |
| 2009/0221456 | A1 | 9/2009 | Harrison et al. |
| 2010/0032160 | A1* | 2/2010 | Wilson ............ C09K 8/502 166/282 |
| 2010/0137168 | A1* | 6/2010 | Quintero ............ C11D 3/18 507/124 |
| 2010/0263863 | A1 | 10/2010 | Quintero et al. |
| 2010/0272765 | A1* | 10/2010 | Ho O ............ A01N 25/04 424/401 |
| 2011/0174492 | A1* | 7/2011 | Robb ............ C09K 8/524 166/308.2 |
| 2011/0220418 | A1* | 9/2011 | Clark ............ E21B 21/068 175/66 |
| 2011/0269652 | A1* | 11/2011 | Marangoni ............ C11D 1/04 507/240 |
| 2012/0157365 | A1 | 6/2012 | Fevola |
| 2012/0245058 | A1* | 9/2012 | Monteiro ............ C09K 8/032 507/110 |
| 2013/0274170 | A1 | 10/2013 | Yuan-Huffman et al. |
| 2013/0303411 | A1 | 11/2013 | Wagle et al. |
| 2014/0069643 | A1 | 3/2014 | Ogle et al. |
| 2014/0128295 | A1 | 5/2014 | Wagle et al. |
| 2014/0142003 | A1 | 5/2014 | Miller et al. |
| 2014/0251614 | A1 | 9/2014 | Muthusamy et al. |
| 2014/0256603 | A1* | 9/2014 | Muthusamy ............ C09K 8/601 507/211 |
| 2015/0010429 | A1* | 1/2015 | Hatchman ............ C11D 1/72 422/12 |
| 2015/0126417 | A1* | 5/2015 | Hatchman ............ C09K 8/58 507/219 |

FOREIGN PATENT DOCUMENTS

| | | |
|---|---|---|
| WO | 2013-181490 A1 | 12/2013 |
| WO | 2014-078014 A2 | 5/2014 |
| WO | 2014-137494 A1 | 9/2014 |

OTHER PUBLICATIONS

PolySuga Mulse D9; 2013; Colonial Chemical Inc.; pp. 1-2 (Year: 2013).*
CCI PolySuga® Phos Naturally Derived Gemini Surfactants; 2007; pp. 1-2 (Year: 2007).*
International Search Report and Written Opinion issued in related PCT Application No. PCT/US2015/031687 dated Mar. 10, 2016, 12 pages.
AROCS 2011 Meeting Abstracts, accessed at https://www.aocs.org/Documents/Meeting%20Abstracts/2011%20Surfactants%20and%20Detergents.pdf, 31 pages.
Examination Report in related Australian application No. 2015395666, dated Mar. 9, 2018 (8 pages).

* cited by examiner

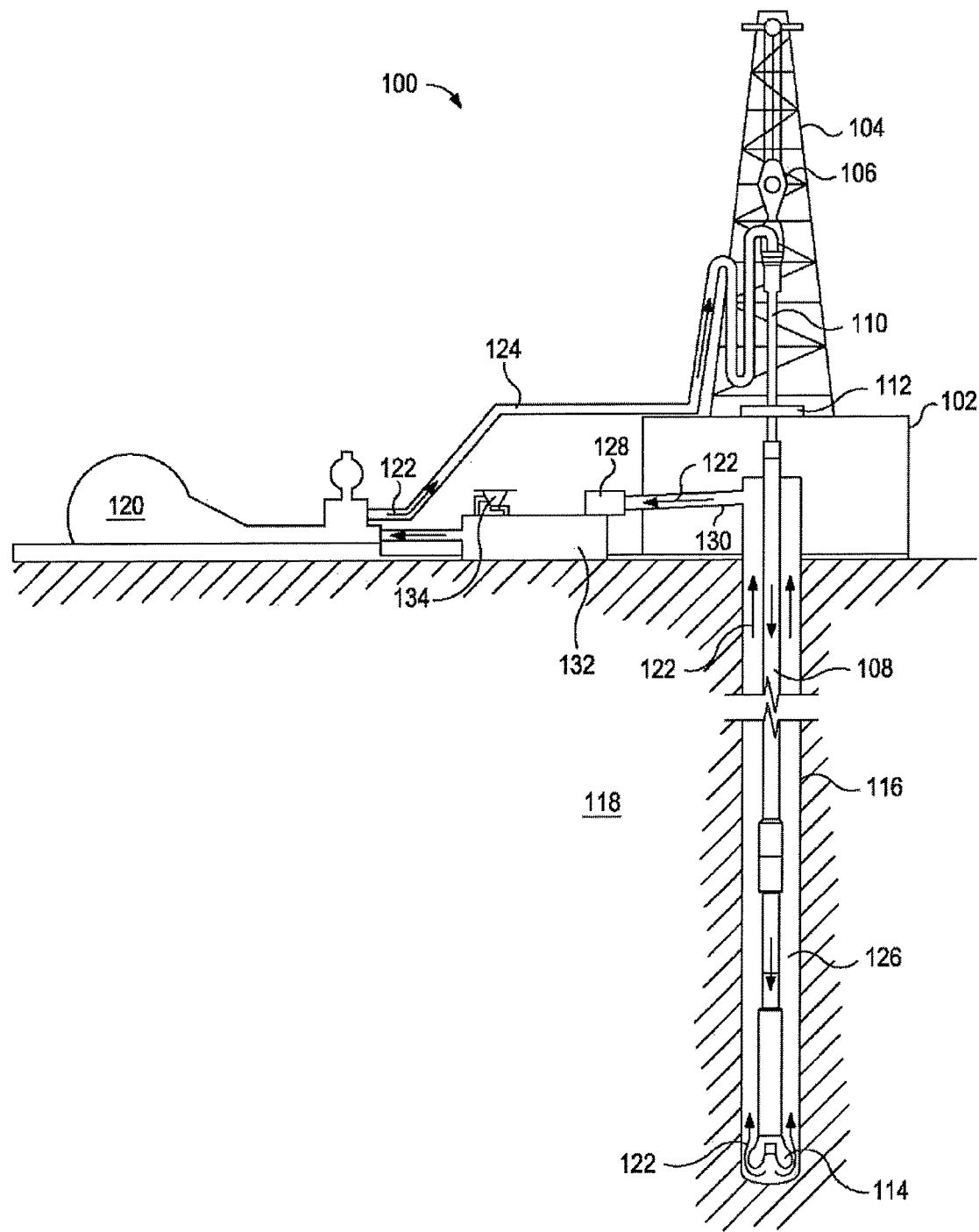

ALKYLPOLYGLUCOSIDE DERIVATIVE FLUID LOSS CONTROL ADDITIVES FOR WELLBORE TREATMENT FLUIDS

BACKGROUND

The present disclosure relates to systems and methods for the control of fluid loss from a wellbore treatment fluid, such as a drilling fluid, to a subterranean formation.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling operations, fracturing operations, cementing operations, and the like.

Natural resources such as oil or gas residing in a subterranean formation can be recovered by drilling wells that penetrate the formation. Drilling operations typically require the use of a drilling fluid. During drilling operations, a viscosified treatment fluid (e.g., a drilling fluid) passes down through the inside of the drill string, exits through the drill bit, and returns to the drilling rig through the annulus between the drill string and well bore. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

Specific drilling fluid systems are selected to optimize a drilling operation in accordance with the characteristics of a particular geological formation. Invert emulsion fluids, for example, are often used to drill swelling or sloughing shales, salt, gypsum, anhydrite and other evaporate formations, hydrogen sulfide-containing formations, and high-temperature formations (such as formations having a downhole temperature greater than about 300 degrees Fahrenheit ("° F.") holes, among others. Invert emulsion fluids are characterized in that they comprise oil as the external or continuous phase of emulsion; such fluids often comprise between about 50:50 to about 95:5 by volume oil phase to water phase. Such oil-based drilling fluids often comprise, in addition to a base oil comprising the external phase of an invert emulsion, a saline, aqueous solution, such as a solution comprising about 30% calcium chloride, comprising the internal phase of the invert emulsion, one or more emulsifiers at the interface of the internal and external phases; and other agents or additives, such as surfactant, for suspension, weight or density, oil-wetting, fluid loss or filtration control, and rheology control.

Rheology is frequently an important property of the wellbore treatment fluid, and specific rheological parameters are preferred for drilling and circulating the fluid through the well bore. The fluid should be sufficiently viscous to suspend barite and drilled cuttings and to carry the cuttings to the well surface. However, the fluid should not be so viscous as to interfere with the drilling operation. Filtration control, which refers to the ability of a treatment fluid to prevent excessive loss of fluid into a formation, is also frequently an important property of a drilling fluid, particularly when drilling through permeable formations where the hydrostatic pressure exceeds the formation pressure. Certain surfactants are known to impart viscoelasticity to treatment fluids, but have heretofore generally been associated with poor fluid loss control or environmental concerns.

BRIEF DESCRIPTION OF THE DRAWINGS

These drawings illustrate certain aspects of some of the embodiments of the present disclosure, and should not be used to limit or define the claims.

FIG. 1 is a diagram illustrating a drilling assembly suitable for use in certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for the control of fluid loss from a wellbore treatment fluid, such as a drilling fluid, to a subterranean formation. More particularly, the present disclosure relates to wellbore treatment fluids exhibiting suitable rheology and fluid loss control comprising an alkylpolyglucoside derivative, to systems comprising same, and to methods of treating a subterranean formation therewith.

Accordingly, in certain embodiments, the present disclosure relates to methods of treating a subterranean formation which comprise providing to a wellbore a treatment fluid comprising a fluid loss control additive comprising an alkylpolyglucoside derivative. For example, in certain embodiments, the present disclosure provides methods of drilling at least a portion of a wellbore in a subterranean formation which comprise providing to a wellbore during the drilling of a portion thereof a drilling fluid comprising a fluid loss control additive comprising an alkylpolyglucoside derivative. The treatment fluids of the present disclosure can exhibit suitable rheology and filtration control, thereby facilitating treatment operations with acceptable fluid loss in even technically demanding and/or permeable formations. The subterranean formations treated using the methods and system of the present disclosure may be any subterranean formation in which an emulsion-based treatment fluid may be used, including a subterranean formation comprising a region or regions of high permeability.

The terms "filtration control agent" and "fluid loss control agent" as used herein will refer to a component of an invert emulsion treatment fluid that reduces the loss (e.g., penetration or transfer), from a wellbore to a subterranean formation, of the treatment fluid and/or a fluid fraction thereof. As disclosed herein, a subterranean formation can be, for example, a hydrocarbon-bearing formation, a mineral-bearing formation, or any other resource-bearing formation, and a wellbore can be, accordingly, an oilwell or portion thereof, or a mine or portion thereof.

As generally embodied herein, the present disclosure provides: emulsion-based treatment fluids comprising an oleaginous phase, a non-oleaginous phase, such as an aqueous phase, and a fluid loss control additive comprising an alkylpolyglucoside derivative, as described in nonlimiting fashion herein. Systems comprising such treatment fluids, including, for example, systems for use in drilling a wellbore in a subterranean formation; and methods of, for example, drilling a wellbore in a subterranean formation while circulating such treatment fluids in the wellbore during drilling, are also provided herein.

The presently disclosed treatment fluids may be suitable for use in all operations in which treatment fluids exhibiting fluid loss control and/or possessing certain rheological parameters, as discussed in nonlimiting fashion herein, are suitable or desired. Accordingly, as embodied herein, the treatment fluid can be, for example and without limitation, one or more of a drilling fluid, a cementing fluid, a remediation fluid, or any other treatment fluid which may, for example, be introduced into a portion of a permeable subterranean formation, intentionally or otherwise. In certain embodiments of the present disclosure, the treatment fluid is a drilling fluid.

Thus the treatment fluids of the present disclosure generally comprise an emulsion based fluid and an alkylpolyglucoside derivative as disclosed herein. The emulsion base fluid can be an oil-in-water emulsion or a water-in-oil emulsion (i.e., an invert emulsion). The alkylpolyglucoside derivative can comprise, for example, at least one alkylpolyglucoside derivative selected from the group consisting of a sorbitan ester crosspolymer, a sulfonate, such as a hydroxyalkylsulfonate, a phosphate, such as a hydroxyalkylphosphate, a betaine, an inorganic salt of any of the foregoing, and any combination thereof. As used herein, the term "crosspolymer" refers to those polymers comprising two or more polymer species covalently bonded to one another, such as by cross-linking bonds. As generally embodied herein, the alkylpolyglucoside derivatives can impart suitable fluid loss control and rheological properties to an emulsion-based drilling fluid as desired and as specified herein. A person of ordinary skill in the art, with the benefit of this disclosure, will be able to select an appropriate fluid loss control additive comprising an alkylpolyglucoside derivative for use in an emulsion-based treatment fluid for a specified subterranean formation, drilling operation, and/or drilling apparatus.

Alkylpolyglucosides are non-ionic surfactants defined by the following chemical structure, wherein m is 2 or greater and n is generally 5 or greater.

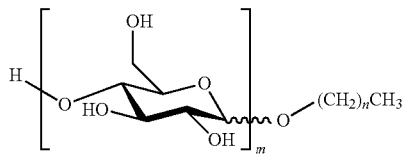

As shown, the alkylpolyglucosides are defined by an oligomer or polymer of glucose residues and terminal alkyl group. The glucosidic portion of the compounds is hydrophilic, while the alkyl component of the compounds is lipophilic. The critical micelle concentration of the alkylpolyglucosides is generally on the order of magnitude of 0.1% or less. Modification of the relative lengths of the glucosidic and alkyl portions will modify the hydrophilic-lipophilic balance (HLB) of the compound, as well as associated polarity and surface activity properties of the compound. Functionalization or co-polymerization of an alkylpolyglucoside to yield an alkylpolyglucoside derivative as provided herein can further impart the physicochemical properties of the selected functional group or co-polymer to the alkylpolyglucoside derivatives, such as by, in some instances, water solubility, surface activity, and Lewis acidity.

Without limiting the disclosure to any particular theory or mechanism, it is believed that the alkylpolyglucoside derivatives of the emulsion-based treatment fluids disclosed herein stably incorporate into micelles within the emulsion, wherein the derivatives are adsorbed at the oil/water interface. The alkylpolyglucoside derivatives are believed to thereby stabilize the emulsion via inter- and/or intra-micellar polymer networks to limit phase separation and associated fluid loss.

Accordingly, among the many potential advantages associated with the methods, systems, and treatment fluids of the present disclosure, only some of which are alluded to herein, the fluid loss control additives disclosed herein can impart good fluid loss control to invert emulsion treatment fluids, even at high downhole temperatures. The alkylpolyglucoside derivatives of the present disclosure are generally also derived from renewable sources, environmentally benign, and biodegradable.

Reference will now be made to certain representative and non-limiting embodiments of the methods, systems, fluids, and additives according to the present disclosure. In certain embodiments of the present disclosure, the alkylpolyglucoside derivatives are functionalized alkylpolyglucosides, such as hydroxypropylsulfonate-functionalized alkylpolyglucosides, hydroxypropylphosphate-functionalized alkylpolyglucosides, and inorganic salts thereof. In certain embodiments of the present disclosure, the alkylpolyglucoside derivatives (e.g., functionalized alkylpolyglucoside derivatives) are alkylpolyglucoside crosspolymers, such as sorbitan ester alkylpolyglucoside crosspolymers, hydroxypropylphosphate alkylpolyglucoside crosspolymers, hydroxypropylsulfonate alkylpolyglucoside crosspolymers, betaine-functionalized alkylpolyglucoside crosspolymers, quaternized alkylpolyglucoside crosspolymers, and sulfosuccinate functionalized alkylpolyglucoside crosspolymers.

Thus, in certain embodiments, the alkylpolyglucoside derivatives of the present disclosure can include, without limitation, alkylpolyglucoside hydroxypropylsulfonates, and inorganic salts thereof. The general chemical structure of alkylpolyglucoside hydroxypropylsulfonates is shown below.

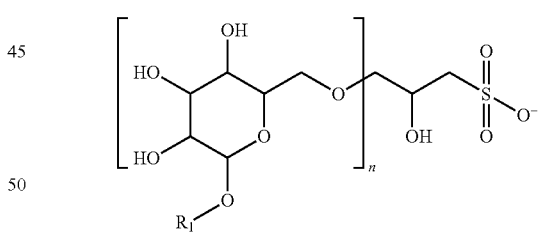

In certain embodiments of the present disclosure, in the formula above, n is between about 2 to about 11 and $R_1$ is a $C_2$-$C_{24}$ alkyl group. Accordingly, in certain embodiments, the alkylpolyglucoside derivatives of the present disclosure can include decylpolyglucoside hydroxypropylsulfonate, laurylpolyglucoside hydroxypropylsulfonate, and sodium salts thereof (e.g., sodium decylglucosides hydroxypropylsulfonate and sodium laurylglucosides hydroxypropylsulfonate), which are commercially available from Colonial Chemicals, Inc. (US) as Suga®Nate 100NC and Suga®Nate 160NC, respectively. These and related compounds can be synthesized according to methods known in the art.

Likewise, in certain embodiments, the alkylpolyglucoside derivatives of the present disclosure can include, without limitation, alkylpolyglucoside hydroxypropylphosphates, and inorganic salts thereof. In certain embodiments of the present disclosure, n is between about 2 to about 11 and $R_1$ is a $C_2$-$C_{24}$ alkyl group. Accordingly, in certain embodiments, the alkylpolyglucoside derivatives of the present disclosure can include butylpolyglucoside hydroxypropylphosphate, hexylpolyglucoside hydroxypropylphosphate, decylpolyglucoside hydroxypropylphosphate, laurylpolyglucoside hydroxypropylphosphate, and coco polyglucoside hydroxypropylsulfonate, and sodium salts thereof (e.g., sodium butylglycosides hydroxypropylphosphate, sodium hexylglycosides hydroxypropylphosphate, sodium decylglycosides hydroxypropylphosphate, sodium laurylglycosides hydroxypropylphosphate, and sodium cocoglycosides hydroxypropylphosphate) which are commercially available from Colonial Chemicals, Inc. (US) as Suga®Fax D04, Suga®Fax D08, Suga®Fax D10, Suga®Fax D12, and Suga®Fax D86, respectively. These and related compounds can be synthesized according to methods known in the art.

Likewise, in certain embodiments, the alkylpolyglucoside derivatives of the present disclosure can include, without limitation, hydroxypropylphosphate functionalized alkylpolyglucoside crosspolymers, and inorganic salts thereof. A representative structure of hydroxypropylphosphate functionalized alkylpolyglucoside crosspolymers is shown below.

In certain embodiments of the present disclosure, in the formula above, n is between about 2 to about 11 and $R_1$ is a $C_2$-$C_{24}$ alkyl group. Accordingly, in certain embodiments, the alkylpolyglucoside derivatives of the present disclosure can include sodium hydroxypropylphosphate decylglucoside crosspolymer, and sodium hydroxypropylphosphate laurylglucoside crosspolymer, which are commercially available from Colonial Chemicals, Inc. (US) as PolySuga®Phos 1000P and PolySuga®Phos 1200P, respectively. These and related compounds can be synthesized according to methods known in the art.

Likewise, in certain embodiments, the alkylpolyglucoside derivatives of the present disclosure can include, without limitation, hydroxypropylsulfonate functionalized alkylpolyglucoside crosspolymers, and inorganic salts thereof. A representative structure of hydroxypropylsulfonate functionalized alkylpolyglucoside crosspolymers is shown below.

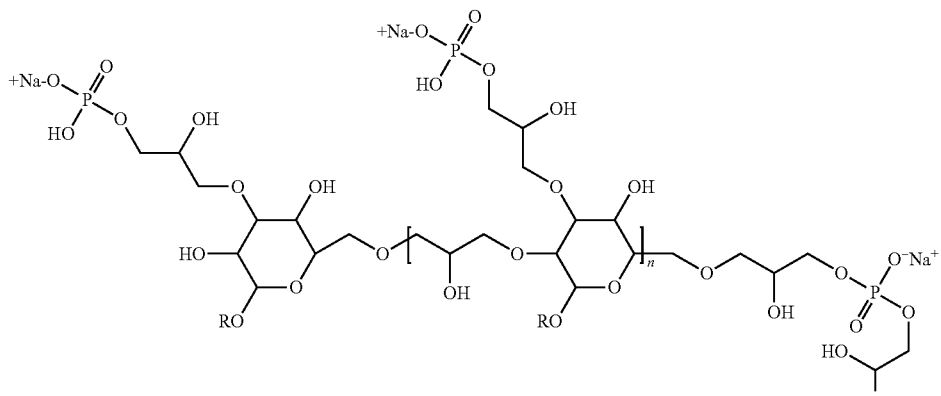

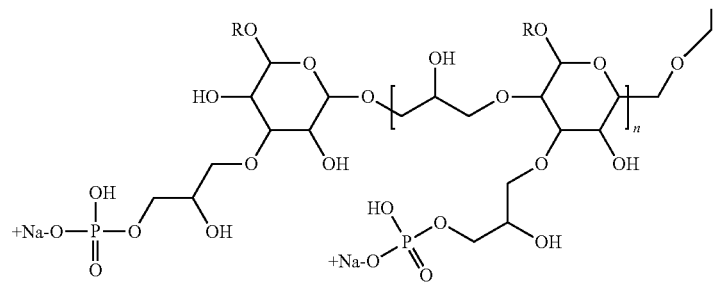

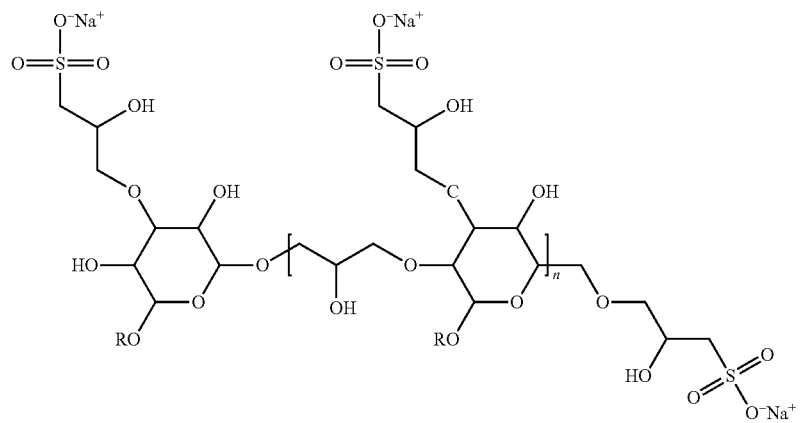

In certain embodiments of the present disclosure, in the formula above, n is between about 2 to about 11 and $R_1$ is a $C_2$-$C_{24}$ alkyl group. Accordingly, in certain embodiments, the alkylpolyglucoside derivatives of the present disclosure can include sodium hydroxypropylsulfonate decylglucoside crosspolymer, and sodium hydroxypropylsulfonate laurylglucoside crosspolymer, which are commercially available from Colonial Chemicals, Inc. (US) as PolySuga®Nate 100P and PolySuga®Nate 160P, respectively. These and related compounds can be synthesized according to methods known in the art.

Likewise, in certain embodiments, the alkylpolyglucoside derivatives of the present disclosure can include, without limitation, betaine-functionalized alkylpolyglucoside crosspolymers, and inorganic salts thereof. A representative structure of betaine-functionalized alkylpolyglucoside crosspolymers is shown below.

In certain embodiments of the present disclosure, n in the formula above is between about 2 to about 11 and $R_1$ is a $C_2$-$C_{24}$ alkyl group. Accordingly, in certain embodiments, the alkylpolyglucoside derivatives of the present disclosure can include $C_{12}$-$C_{14}$ sodium bis-hydroxyethylglycinate lauryl-glucosides crosspolymer, and $C_{12}$ to $C_{18}$ sodium bis-hydroxyethylglycinate coco-glucosides crosspolymer, which are commercially available from Colonial Chemicals, Inc. (US) as PolySuga®Betaine L and PolySuga®Betaine C, respectively. These and related compounds can be synthesized according to methods known in the art.

Likewise, in certain embodiments, the alkylpolyglucoside derivatives of the present disclosure can include, without limitation, quaternized alkylpolyglucoside crosspolymers, and inorganic salts thereof. A representative structure of quaternized functionalized alkylpolyglucoside crosspolymers is shown below.

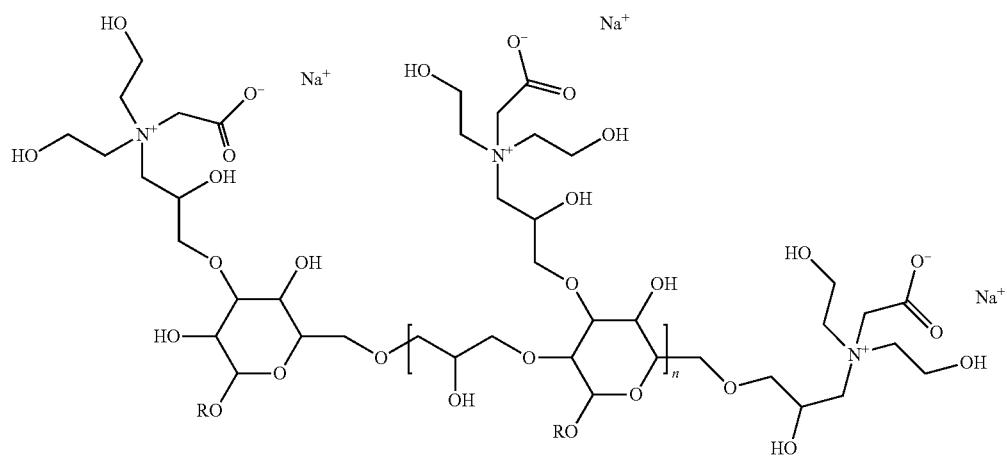

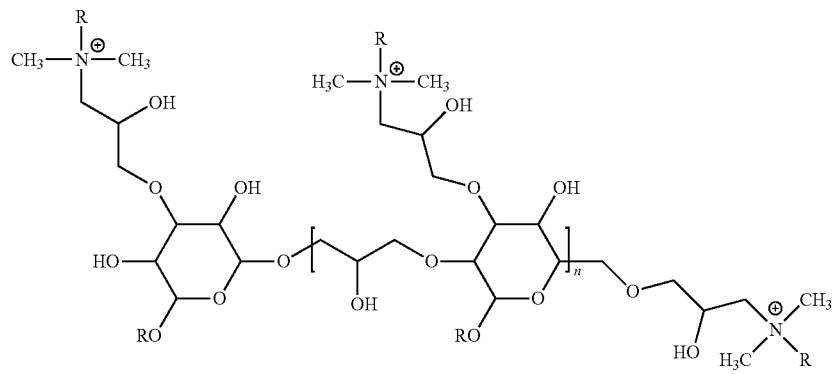

In certain embodiments of the present disclosure, in the formula above, n is between about 2 to about 11, R is a $C_2$-$C_{24}$ alkyl group, and the quaternary compound is a stearyldimonium, hydroxypropyltrimonium, or lauryldimonium moiety. Accordingly, in certain embodiments, the alkylpolyglucoside derivatives of the present disclosure can include poly(cocoglucosides hydroxypropyltrimonium chloride), poly(stearyldimonium hydroxypropylpropyldecylglucosides chloride), poly(lauryldimonium hydroxypropyl decylglucosides chloride), poly(lauryldimonium hydroxypropyl laurylglucosides chloride), and poly(laurylglucosides hydroxypropyltrimonium chloride), which are commercially available from Colonial Chemicals, Inc. (US) as Poly Suga® Quat TM8610P, Poly Suga® Quat S1010P, Poly Suga® Quat L1010P, Poly Suga® Quat L1210P, and Poly Suga® Quat TM1218P, respectively. These and related compounds can be synthesized according to methods known in the art.

Likewise, in certain embodiments, the alkylpolyglucosides of the present disclosure can include sulfosuccinate functionalized alkylpolyglucoside crosspolymers. A representative structure of sulfosuccinate functionalized alkylpolyglucoside crosspolymers is shown below.

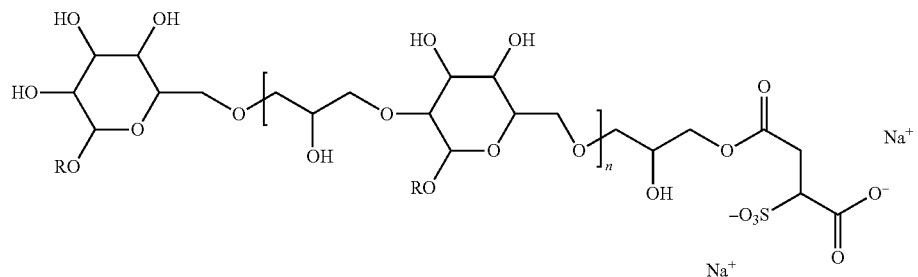

In certain embodiments of the present disclosure, in the formula above, n is between about 2 to about 11, and R is a $C_2$-$C_{24}$ alkyl group. Accordingly, in certain embodiments, the alkylpolyglucoside derivatives of the present disclosure can include disodium laurylglucosides sulfosuccinate crosspolymer and disodium decylglucosides sulfosuccinate crosspolymer, chloride), which are commercially available from Colonial Chemicals, Inc. (US) as PolySuga®Mate L and PolySuga®Mate D, respectively. These and related compounds can be synthesized according to methods known in the art.

Likewise, in certain embodiments, the alkylpolyglucosides of the present disclosure can include sorbitan ester alkylpolyglucoside crosspolymers. Suitable sorbitan esters include, without limitation, oleate, laurate, stearate, and palmitate. The general structure of a sorbitan oleate polyglucoside crosspolymer is shown below:

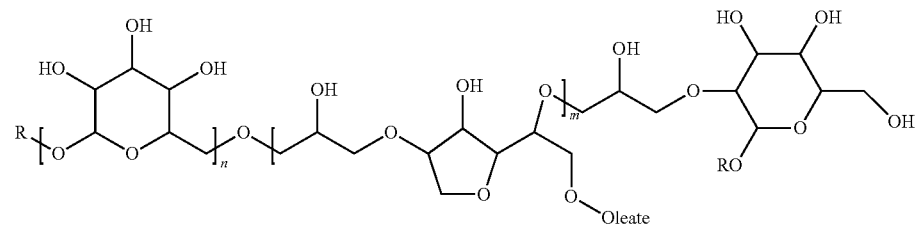

In certain embodiments of the present disclosure, in the formula above, n is between about 2 to about 20, each R group is an alkyl group having 8 to 24 carbons, wherein the R groups can be the same or different, and the range of m is between 1 to about 10 (for the sorbitan oleate units). For example, each R group can be a $C_{10}$ alkyl group. Accordingly, in certain embodiments, the alkylpolyglucoside derivatives of the present disclosure can include, without limitation, sorbitan oleate decylpolyglucoside crosspolymers, such as those commercially available from Colonial Chemicals, Inc. (US) as PolySuga®Mulse D-3I, PolySuga®Mulse D-6, and PolySuga®Mulse D-9, sorbitan laurate decylpolyglucoside crosspolymers, sorbitan stearate decylpolyglucoside crosspolymers, and sorbitan palmitate decylpolyglucoside crosspolymers. These and related compounds can be synthesized according to methods known in the art.

In certain embodiments, such as the sorbitan ester alkylpolyglucoside crosspolymers discussed above, the alkylpolyglucoside derivatives of the present disclosure can include surfactants known as "gemini" surfactants, wherein two amphiphilic molecules are chemically linked to an intervening spacer compound. Gemini surfactants can advantageously exhibit low critical micelle concentrations and high surface activity relative to monomeric surfactants, and further can exhibit a propensity to self-assemble in rod- or thread-shaped micelles.

The suitability of a particular alkylpolyglucoside derivative for use as an additive in a specific emulsion-based treatment fluid can depend on several factors, including the ratio of oil and water in the emulsion base, the composition of the aqueous phase, the additional additives present in the treatment fluid, and the desired rheology of the fluid. Likewise, the composition of the emulsion-based treatment fluid and alkylpolyglucoside fluid loss control additive can vary based on the subterranean formation itself, including the composition of the formation, the measured or predicted downhole temperature of the formation, and the pH and ionicity in situ. Such considerations can influence, for example, the preferred functional groups, HLB, surface activity, and/or CMC of the alkylpolyglucoside derivative. Accordingly, the precise composition of the fluid control additives of the present disclosure can be selected based on these and other considerations. The alkylpolyglucoside derivatives of the present disclosure will typically have a HLB of about 3 to about 12, and a molecular weight of between about 5000 and about 50000.

As demonstrated by the testing data provided in the Examples below, the fluid loss control additives comprising an alkylpolyglucoside derivative of the present disclosure can provide suitable fluid loss control under various conditions. Thus, the treatment fluids (e.g., drilling fluids) and the fluid loss control additives of the present disclosure can be suitable for use in treatment operations and/or subterranean formations wherein limited fluid loss is advantageous.

In certain embodiments of the present disclosure, the fluid loss control additives comprising an alkylpolyglucoside derivative can provide suitable fluid loss control at elevated temperatures, such as a temperature of 250° F. or greater, or 350° F. or greater, or 450° F. or greater. Accordingly, the fluid control additives comprising an alkylpolyglucoside derivative of the present disclosure can be selected for their suitability for treatment of a subterranean formation based on, inter alia, the downhole temperature of the subterranean formation.

The alkylpolyglucoside derivatives and fluid loss control additives of the present disclosure can be included in the treatment fluid in an amount sufficient to provide a desired degree of fluid loss control. In some embodiments of the present disclosure, the alkylpolyglucoside derivatives agents are included in the treatment fluid at a concentration of about 3 pounds per barrel (ppb) of the fluid to about 9 ppb, or about 4 ppb to about 8 ppb.

The type and amount of the alkylpolyglucoside derivative fluid loss control agents included in a particular treatment fluid or method of the disclosure may depend upon, among other factors, the composition and/or temperature of the subterranean formation, the chemical and hygroscopic composition of the formation substrate, and the like. It is within the ability of one skilled in the art, with the benefit of this disclosure, to determine the type and amount of fluid loss control agent to include in the treatment fluids of the present disclosure to achieve the desired results.

The treatment fluids used in the methods and systems of the present disclosure may comprise any emulsion-based fluid known in the art, including water-in-oil emulsion fluids and oil-in-water emulsion fluids. The term "emulsion-based fluid" refers to the major component of the fluid (as opposed to components dissolved and/or suspended therein), and does not indicate any particular condition or property of that fluids such as its mass, amount, pH, etc. Aqueous fluids (such as an aqueous fluid constituting an aqueous phase of an emulsion) that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids (such as a non-aqueous fluid constituting an oleaginous phase of an emulsion) that may be suitable for use in the methods and systems of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like. The base emulsion may be present in the treatment fluid in an amount in the range of about 20% to about 99.9% by weight or in an amount in the range of about 60% to about 99.9% by weight of the treatment fluid or in an amount in the range of about 95% to about 99.9% by weight of the treatment fluid.

In certain embodiments, the treatment fluids used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional H$_2$S scavengers, CO$_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a filtercake additive) may be added to the treatment fluid to provide further fluid loss control. In certain embodiments, additional fluid loss additives are not required to achieve suitable fluid loss control. A person skilled in the art, with the benefit of this disclosure, will recognize the types of additives that may be included in the fluids of the present disclosure for a particular application.

The present disclosure in some embodiments provides methods for using the treatment fluids to carry out, e.g., a drilling operation. Thus, in some embodiments, the treatment fluids of the present disclosure may be used in treating a portion of a subterranean formation, for example, in drilling operations. In certain embodiments, a treatment fluid may be introduced into a subterranean formation during a drilling operation on a portion thereof, such as a wellbore that penetrates a subterranean formation. In certain embodiments, a drilling fluid is introduced into a wellbore during drilling of the wellbore. The drilling fluid can be circulated in the wellbore to contact a portion of the wellbore and/or one or more components of a drilling system.

Accordingly, in certain embodiments, a drilling fluid of the present disclosure can be employed in drilling operations. The drilling operations—whether drilling a vertical or directional or horizontal borehole, conducting a sweep, or running casing and cementing—may be conducted as known to those of ordinary skill in the art with other drilling fluids. For example, a drilling fluid can be prepared or obtained and circulated through a wellbore as the wellbore is being drilled, swept, cemented, and/or and cased to facilitate the drilling operation. The drilling fluid can remove drill cuttings from the wellbore, cool and lubricate the drill bit, support the drill pipe and drill bit, and provides a hydrostatic head to maintain the integrity of the wellbore walls and prevent well blowouts. The specific formulation of the drilling fluid can be optimized for the particular drilling operation and for the particular subterranean formation characteristics and conditions (such as temperatures). For example, the fluid can be weighted as appropriate based on the formation pressures and/or thinned as appropriate for the formation temperatures. Further, the fluids of the present disclosure can be recycled during a drilling operation such that fluids circulated in a wellbore may be recirculated in the wellbore after returning to the surface for removal of drill cuttings for example. The drilling fluids can be selected for use in a drilling operation to reduce fluid loss during the drilling operation and/or to comply with environmental regulations governing drilling operations in a particular subterranean formation.

The exemplary additives and/or treatment fluids disclosed herein may directly or indirectly affect one or more components or pieces of equipment associated with the preparation, delivery, recapture, recycling, reuse, and/or disposal of the disclosed additives and/or treatment fluids. For example, and with reference to FIG. 1, the disclosed additives and/or treatment fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108, which in certain embodiments may be driven either by a downhole motor and/or via rotation of the drill string 108 from the well surface. In those embodiments, as the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives and/or treatment fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives and/or treatment fluids may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed additives and/or treatment fluids may be stored, reconditioned, and/or regulated until added to the drilling fluid 122.

As mentioned above, the disclosed additives and/or treatment fluids may directly or indirectly affect the components and equipment of the drilling assembly 100. For example, the disclosed additives and/or treatment fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary additives and/or treatment fluids.

The disclosed additives and/or treatment fluids may directly or indirectly affect the pump 120, which representatively includes any conduits, pipelines, trucks, tubulars, and/or pipes used to fluidically convey the additives and/or treatment fluids downhole, any pumps, compressors, or motors (e.g., topside or downhole) used to drive the additives and/or treatment fluids into motion, any valves or related joints used to regulate the pressure or flow rate of the additives and/or treatment fluids, and any sensors (i.e., pressure, temperature, flow rate, etc.), gauges, and/or combinations thereof, and the like. The disclosed additives and/or treatment fluids may also directly or indirectly affect the mixing hopper 134 and the retention pit 132 and their assorted variations.

The disclosed additives and/or treatment fluids may also directly or indirectly affect the various downhole equipment and tools that may come into contact with the additives and/or treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed additives and/or treatment fluids may also directly or indirectly affect any downhole heat exchangers, valves and corresponding actuation devices, tool seals, packers and other wellbore isolation devices or components, and the like associated with the wellbore 116. The disclosed additives and/or treatment fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed additives and/or treatment fluids may also directly or indirectly affect any transport or delivery equipment used to convey the additives and/or treatment fluids to the drilling assembly 100 such as, for example, any transport vessels, conduits, pipelines, trucks, tubulars, and/or pipes used to fluidically move the additives and/or treatment fluids from one location to another, any pumps, compressors, or motors used to drive the additives and/or treatment fluids into motion, any valves or related joints used to regulate the pressure or flow rate of the additives and/or treatment fluids, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Representative alkylpolyglucoside derivative fluid loss control agents according to the present disclosure were tested in emulsion-based treatment fluids to evaluate fluid loss control performance. Testing was conducted in accordance with standard procedures set forth in Recommended Practice 13B-2, Recommended Practice for Field Testing of Oil-based Drilling Fluids, Fourth Edition, American Petroleum Institute, Mar. 1, 2005, known to those of ordinary skill in the art. The results are provided in Table 1 below.
Experimental Methods, Fluids, and Design Three experimental drilling fluids were prepared. The fluids were ENCORE®-based invert emulsions having an oil-to-water ratio of 80:20 and a water phase salinity of 250,000 ppm. ENCORE® is a synthetic oil base comprising isomerized olefins, available from Halliburton Energy Services, Inc., in Houston, Tex. and Duncan, Okla. Each of the fluids contained lime, calcium chloride, and barite clay having a mesh size of 325, as well as the following additives, which are available from Halliburton Energy Services unless otherwise specified: LE SUPERMUL™, a polyaminated fatty acid emulsifier; INVERMUL TAU-MOD®, a fibrous viscosifying agent; AQUAGEL GOLD SEAL®, a 200 mesh clay bentonite; BARACARB® 5, a fluid densifier and bridging agent; RHEMOD™ L, a modified fatty acid viscosifier; and REV DUST®, an organophilic clay- and lignite-free drill solid available from Milwhite Inc, in Houston, Tex. Fluid 1 further contained sodium butylpolyglucoside hydroxypropylphosphate (sodium butylglucosides hydroxypropylphosphate, available from Colonial Chemicals, Inc. as Suga®Fax D04), while Fluid 2 further contained sorbitan oleate decylglucoside crosspolymer, available from Colonial Chemicals, Inc. as PolySuga®Mulse-D3I. The Control Fluid did not contain an alkylpolyglucoside derivative. The compositions of the experimental drilling fluids are provided in Table 1 below.

The fluids were mixed according to the following procedures. A known volume of the external phase was added to a mixing container, placed on a mixer base and mixed at 11,000 revolutions per minute (rpm). The ingredients of each fluid were then added to the external phase and mixed for at least 5 minutes before the next ingredient was added. The ingredients were added at the indicated concentrations of weight by volume of the treatment fluid—i.e., in units of pounds per barrel of the treatment fluid. Mixing was performed at ambient temperature and pressure (about 71° F. (22° C.) and about 1 atm (0.1 MPa)). After mixing, each of the treatment fluids was hot-rolled prior to rheology testing by placing the fluid in a stainless steel aging cell, pressurizing the aging cell with nitrogen gas to prevent the fluid from vaporizing, placing the cell in a hot rolling oven at 150° F., and rolling the container at the specified temperature for 16 hours.

After hot rolling, fluid loss after 30 minutes under simulated conditions of high pressure and high temperature ("HPHT") was measured at 250° F. and a differential pressure of 500 psi or for each of the fluids. HPHT testing measures the static filtration behavior (i.e., fluid loss) of treatment fluids at elevated temperatures. HPHT fluid loss is expressed in units of mL for fluid loss observed. Although the test can simulate downhole temperature conditions, it does not simulate downhole pressure. Total pressure in a cell should not exceed 700 psi, and the differential pressure across the filter medium is specified as 500 psi. Because these cells are half the size of the ambient filtration area, HPHT filtrate volumes after 30 minutes are doubled to approximate in situ performance.

Rheological parameters of the fluids were measured at 120° F. after mixing and static aging of the fluids. The fluids were placed into the test cell of a rotational viscometer (a FANN® Model 35 viscometer) fitted with a Bob and Sleeve attachment and a spring number 1, then tested at the specified temperature and ambient pressure (about 1 atm). Torque readings were recorded at 3, 6, 100, 200, 300, and 600 RPM. Plastic viscosity ("PV") of the treatment fluids was obtained from the Bingham-Plastic rheological model and calculated as the difference between the 600 rpm and 300 RPM measurements. Yield point ("YP") of the treatment fluids was calculated as the difference between the plastic viscosity and the 300 RPM dial measurement. Low-shear yield point ("LSYP") of the fluids was calculated by subtracting double the value of the 3 RPM measurement from the corresponding 6 RPM measurement. The ten second gel strength of the treatment fluids was subsequently measured by observing maximum viscometer deflection upon resuming viscometer rotation at 3 RPM after interruption for ten seconds. Likewise, the ten minute gel strength of the treatment fluids was measured by observing maximum viscometer deflection upon resuming viscometer rotation at 3 RPM after interruption for ten minutes. PV is expressed in units of centipoise (cP); YP, LSYP, and Gel Strength are expressed in units of pounds per 100 square feet (lb/100 ft$^2$).

After rheology testing was completed, each of the fluids was resealed in an aging cell, repressurized with nitrogen, then subject to static aging at 350° F. for 24 hours. After static aging, fluid loss after 30 minutes under conditions of high temperature and high pressure ("HPHT") was measured at 350° F. or for each of the fluids. The electrical stability ("ES") of the fluids was also measured as known in the art.

Results tives can provide fluid loss control with limited effect or beneficial effect on drilling fluid rheology. Such fluid loss control agents can be environmentally benign and/or cost effective, and can represent a suitable and/or desirable alternative to synthetic polymeric fluid loss control agents known in the art.

Certain embodiments of the present disclosure are directed to methods comprising providing a treatment fluid comprising an emulsion comprising an oleaginous phase and a non-oleaginous phase, and a fluid loss control additive comprising an alkylpolyglucoside derivative; and introducing the treatment fluid into a wellbore. Certain embodiments of the present disclosure are directed to a method of drilling a wellbore comprising: providing a drilling fluid comprising an emulsion comprising an external oleaginous phase and an internal non-oleaginous phase, and a fluid loss control additive comprising an alkylpolyglucoside derivative;

TABLE 1

Rheology and Fluid Loss of Treatment Fluids Containing Alkylpolyglucoside Derivatives

| Materials | Fluid 1 | Fluid 2 | Control |
|---|---|---|---|
| ENCORE, bbl | 0.58 (158.02 g) | 0.58 (158.02 g) | 0.58 (158.02 g) |
| LE SUPERMUL, ppb | 14 | 14 | 14 |
| INVERMUL NT, ppb | 3 | 3 | 3 |
| Lime, ppb | 4 | 4 | 4 |
| CaCl$_2$, bbl | 0.16 (17.38 g in 50.07 g water) | 0.16 (17.38 g in 50.07 g water) | 0.16 (17.38 g in 50.07 g water) |
| Alkylpolyglucoside Derivative, ppb | 6 (Suga®Fax D04) | 6 (PolySuga®Mulse-D3I) | N/A |
| TAU-MOD, ppb | 6 | 6 | 6 |
| AQUAGEL GOLDSEAL, ppb | 4 | 4 | 4 |
| BARACARB-5, ppb | 10 | 10 | 10 |
| RHEMOD L, ppb | 3 | 3 | 3 |
| Rev Dust, ppb | 20 | 20 | 20 |
| B325 Mesh Barite, ppb | 209.52 | 209.52 | 209.52 |

| | Hot rolled, 16 hrs, 150° F. | | | | | |
|---|---|---|---|---|---|---|
| Rheology @ 120° F. | After Hot Rolling | After Static Aging at 350° F. | After Hot Rolling | After Static Aging at 350° F. | After Hot Rolling | After Static Aging at 350° F. |
| 600 | 72 | 71 | 71 | 78 | 74 | 78 |
| 300 | 43 | 44 | 42 | 51 | 45 | 52 |
| 200 | 33 | 33 | 32 | 41 | 35 | 43 |
| 100 | 22 | 23 | 21 | 30 | 22 | 33 |
| 6 | 10 | 10 | 9 | 16 | 9 | 20 |
| 3 | 9 | 9 | 7 | 15 | 8 | 19 |
| PV, cP | 29 | 27 | 29 | 27 | 29 | 26 |
| YP, lb/100 ft$^2$ | 14 | 17 | 13 | 24 | 16 | 26 |
| LSYP, lb/100 ft$^2$ | 8 | 8 | 5 | 14 | 7 | 18 |
| Gel strength, 10 seconds | 24 | 16 | 14 | 23 | 12 | 28 |
| Gel strength, 10 minutes | 39 | 17 | 41 | 33 | 39 | 35 |
| ES | 1084 | 1098 | 629 | | 448 | 556 |
| HPHT @ 250° F., mL | 7.6 | | 3.8 | | 8.8 | |
| HPHT @ 350° F., mL | | 10.4 | | 6.4 | | 16.4 |

Fluid 1 and Fluid 2 exhibited relatively low PV consistent with the PV observed for the Control Fluid. The YP and LSYP of Fluid 1 and Fluid 2 after hot rolling and static aging were also acceptable, and moderately lower than corresponding measurements for the Control Fluid. HPHT fluid loss at 250° F. after hot rolling and at 350° F. after static aging was decreased in both Fluid 1 and Fluid 2 relative to the Control Fluid.

Accordingly, in certain embodiments of the present disclosure, drilling fluids comprising alkylpolyglucoside derivatives are disclosed. The alkylpolyglucoside derivapumping the drilling fluid through a drill string and a drill bit disposed in at least a portion of the wellbore; and using the drilling fluid to drill at least a portion of the wellbore.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising
    an emulsion comprising an oleaginous phase and a non-oleaginous phase, and
    a fluid loss control additive comprising an alkylpolyglucoside derivative, wherein the alkylpolyglucoside derivative comprises a surfactant having two amphiphilic molecules chemically linked to a spacer compound; and
forming one or more micelles within the treatment fluid by adsorbing the fluid loss control additive thereby reducing a fluid loss amount of the treatment fluid; and
introducing the treatment fluid into a wellbore, wherein at least a portion of the wellbore has a temperature of 250° F. or greater.

2. The method of claim 1, wherein the treatment fluid further comprises a filter cake additive.

3. A method of drilling a wellbore comprising:
providing a drilling fluid comprising
    an emulsion comprising an external oleaginous phase and an internal non-oleaginous phase, and
    a fluid loss control additive comprising an alkylpolyglucoside derivative, wherein the alkylpolyglucoside derivative comprises a surfactant having two amphiphilic molecules chemically linked to a spacer compound;
forming one or more micelles within the treatment fluid by adsorbing the fluid loss control additive thereby reducing a fluid loss amount of the treatment fluid;
pumping the drilling fluid through a drill string and a drill bit disposed in at least a portion of the wellbore; and
using the drilling fluid to drill at least a portion of the wellbore, wherein at least a portion of the wellbore has a temperature of 250° F. or greater.

4. The method of claim 3, wherein the alkylpolyglucoside derivative is an alkylpolyglucoside crosspolymer selected from the group consisting of: a sorbitan ester alkylpolyglucoside crosspolymer, a hydroxypropylsulfonate functionalized alkylpolyglucoside crosspolymer, a hydroxypropylphosphate functionalized alkylpolyglucoside crosspolymer, a betaine functionalized alkylpolyglucoside crosspolymer, a quaternized alkylpolyglucoside crosspolymer, a sulfosuccinate functionalized alkylpolyglucoside crosspolymer, any inorganic salt thereof, and any combination thereof.

5. The method of claim 3, wherein the alkylpolyglucoside derivative comprises a functionalized alkylpolyglucoside.

6. The method of claim 5, wherein the functionalized alkylpolyglucoside is selected from the group consisting of: an alkylpolyglucoside hydroxypropylphosphate, an alkylpolyglucoside hydroxypropylsulfonate, any inorganic salt thereof, and any combination thereof.

7. The method of claim 6, wherein the functionalized alkylpolyglucoside is the alkylpolyglucoside hydroxypropylphosphate and is selected from the group consisting of: a butylpolyglucoside hydroxypropylphosphate, a hexylpolyglucoside hydroxypropylphosphate, a decylpolyglucoside hydroxypropylphosphate, a laurylpolyglucoside hydroxypropylphosphate, a coco polyglucoside hydroxypropylsulfonate, any inorganic salt thereof, and any combination thereof.

8. The method of claim 6, wherein the functionalized alkylpolyglucoside is the alkylpolyglucoside hydroxypropylsulfonate and is selected from the group consisting of: a decylpolyglucoside hydroxypropylsulfonate, a laurylpolyglucoside hydroxypropylsulfonate, any inorganic salt thereof, and any combination thereof.

9. The method of claim 3, wherein the alkylpolyglucoside derivative comprises an alkylpolyglucoside crosspolymer.

10. The method of claim 9, wherein the alkylpolyglucoside crosspolymer is selected from the group consisting of: a sorbitan ester alkylpolyglucoside crosspolymer, a hydroxypropylsulfonate functionalized alkylpolyglucoside crosspolymer, a hydroxypropylphosphate functionalized alkylpolyglucoside crosspolymer, a betaine functionalized alkylpolyglucoside crosspolymer, a quaternized alkylpolyglucoside crosspolymer, a sulfosuccinate functionalized alkylpolyglucoside crosspolymer, any inorganic salt thereof, and any combination thereof.

11. The method of claim 10, wherein the alkylpolyglucoside crosspolymer is the sorbitan ester decylpolyglucoside crosspolymer and is selected from the group consisting of: a sorbitan oleate decylpolyglucoside crosspolymer, a sorbitan laurate decylpolyglucoside crosspolymer, a sorbitan stearate decylpolyglucoside crosspolymer, a sorbitan palmitate decylpolyglucoside crosspolymer, and any combination thereof.

12. The method of claim 10, wherein the alkylpolyglucoside crosspolymer is the hydroxypropylphosphate functionalized alkylpolyglucoside crosspolymer and is selected from the group consisting of: a hydroxypropylphosphate decylglucoside crosspolymer, a hydroxypropylphosphate laurylglucoside crosspolymer, any inorganic salt thereof, and any combination thereof.

13. The method of claim 10, wherein the alkylpolyglucoside crosspolymer is the hydroxypropylsulfonate functionalized alkylpolyglucoside crosspolymer and is selected from the group consisting of: a hydroxypropylsulfonate decylglucoside crosspolymer, a hydroxypropylsulfonate laurylglucoside crosspolymer, any inorganic salt thereof, and any combination thereof.

14. The method of claim 10, wherein the alkylpolyglucoside crosspolymer is the betaine functionalized alkylpolyglucoside crosspolymer and is selected from the group consisting of: a $C_{12}$-$C_{14}$ bis-hydroxyethylglycinate laurylglucosides crosspolymer, a $C_{12}$ to $C_{18}$ sodium bis-hydroxyethylglycinate coco-glucosides crosspolymer, any inorganic salt thereof, and any combination thereof.

15. The method of claim 10, wherein the alkylpolyglucoside crosspolymer is the quaternized alkylpolyglucoside crosspolymer and is selected from the group consisting of: a $C_{12}$-$C_{14}$ bis-hydroxyethylglycinate lauryl-glucosides crosspolymer, a C12 to C18 sodium bis-hydroxyethylglycinate coco-glucosides crosspolymer, any inorganic salt thereof, and any combination thereof.

16. The method of claim 10, wherein the alkylpolyglucoside crosspolymer is the sulfosuccinate functionalized alkylpolyglucoside crosspolymer and is selected from the group consisting of: a laurylglucosides sulfosuccinate crosspolymer, a decylglucosides sulfosuccinate crosspolymer, any inorganic salt thereof, and any combination thereof.

17. The method of claim 3, wherein the treatment fluid further comprises a filter cake additive.

18. A method of drilling a wellbore comprising:
    providing a drilling fluid comprising
        an emulsion comprising an oleaginous phase and a non-oleaginous phase, and
        a fluid loss control additive comprising an alkylpolyglucoside derivative, wherein the alkylpolyglucoside derivative comprises a surfactant having two amphiphilic molecules chemically linked to a spacer compound;
    forming one or more micelles within the treatment fluid by adsorbing the fluid loss control additive thereby reducing a fluid loss amount of the treatment fluid;
    pumping the drilling fluid through a drill string and a drill bit disposed in at least a portion of the wellbore; and
    using the drilling fluid to drill at least a portion of the wellbore, wherein at least a portion of the wellbore has a temperature of 250° F. or greater.

19. The method of claim 18, wherein the alkylpolyglucoside derivative is selected from the group consisting of: a sorbitan oleate decylpolyglucoside crosspolymer, a sorbitan laurate decylpolyglucoside crosspolymer, a sorbitan stearate decylpolyglucoside crosspolymer, a sorbitan palmitate decylpolyglucoside crosspolymer, and any combination thereof.

* * * * *